United States Patent [19]

Rockenfeller et al.

[11] Patent Number: 5,025,635
[45] Date of Patent: Jun. 25, 1991

[54] CONTINUOUS CONSTANT PRESSURE STAGING OF SOLID-VAPOR COMPOUND REACTORS

[75] Inventors: Uwe Rockenfeller; Lance D. Kirol, both of Boulder City, Nev.

[73] Assignee: Rocky Research, Boulder City, Nev.

[21] Appl. No.: 436,431

[22] Filed: Nov. 14, 1989

[51] Int. Cl.$^5$ .............................................. F25B 17/00
[52] U.S. Cl. ........................................ 62/106; 62/112; 62/114; 62/324.1; 62/480
[58] Field of Search ................. 62/480, 476, 106, 114, 62/324.1, 112

[56] References Cited

U.S. PATENT DOCUMENTS

| | | |
|---|---|---|
| 668,310 | 2/1901 | Howell . |
| 1,887,909 | 11/1932 | Altenkirch . |
| 2,088,276 | 7/1937 | Nesselmann et al. . |
| 2,496,459 | 9/1950 | Kleen . |
| 4,111,002 | 9/1978 | Van Mal et al. ...................... 62/467 |
| 4,523,635 | 6/1985 | Nishizaki et al. ................. 62/102 X |
| 4,610,148 | 9/1986 | Shelton .................................. 62/480 |
| 4,637,218 | 1/1987 | Tchernev ............................ 62/480 X |
| 4,713,944 | 12/1987 | Januschkowetz ..................... 62/480 |
| 4,765,395 | 8/1988 | Paeye et al. ...................... 62/480 X |

FOREIGN PATENT DOCUMENTS

| | | |
|---|---|---|
| 272868 | 5/1927 | United Kingdom . |
| 2095818 | 3/1981 | United Kingdom . |

*Primary Examiner*—Lloyd L. King
*Attorney, Agent, or Firm*—Jerry R. Seiler

[57] ABSTRACT

A method of transferring and recovering energy comprises selecting a plurality of two or more different compounds comprising a solid reactant adsorbent and a gaseous reactant adsorbed thereon, each of said compounds having a different gaseous reactant vapor pressure, substantially independent of the concentration of the gaseous reactant, locating a first set of the different compounds in a first reactor and a second set of the different compounds in a second reactor, pressurizing the first reactor at a first pressure and the second reactor at a second pressure, supplying a heat transfer fluid at a first temperature along the first reactor in thermal communication with the first set of compounds, whereby said compounds desorb said gaseous reactant in endothermic reactions, supplying a heat transfer fluid at a second temperature, typically lower than the first temperature, along second reactor in thermal communication with the second set of compounds, whereby the compounds adsorb the gaseous reactant in exothermic reactions, and directing at least a portion of the heat released during the exothermic reactions or a least a portion of heat absorbed during the endothermic reactions to heat exchange means for energy recovery. The invention includes apparatus for carrying out the method.

47 Claims, 2 Drawing Sheets

CONTINUOUS CONSTANT PRESSURE STAGING OF SOLID-VAPOR COMPOUND REACTORS

BACKGROUND OF THE INVENTION

The use of compounds comprising solid-vapor compositions formed by adsorption of gas molecules on a solid adsorbent as heat pump working materials is known in the art. Heat pump systems using such materials have a number of advantages over other heat pumps for residential and commercial space conditioning, industrial heat pumping and refrigeration. Such advantages include higher temperature lift created by the solid-vapor media as compared to other sorption media thus eliminating the need for cooling towers or lift staging. Moreover, the apparatus used for the solid-vapor compound heat pumps require few, if any, moving parts, resulting in simple and reliable hardware. Additionally, such systems do not use the objectionable CFC's.

The solid-vapor compounds suitable for heat pumps include complex compounds which are materials which adsorb molecules of gas to form coordinative bonds in which the gaseous reactant coordinates via electron displacement with the solid adsorbent, commonly a solid metal inorganic salt. The adsorption/desorption process releases significant heat during adsorption and adsorbs energy during the desorption phase. Unlike most other sorption processes, the entire adsorption or desorption reactions may occur at constant temperature thus eliminating problems with hot and cold sorber ends. Useful gaseous reactants include water, ammonia, methanol, methane, ethane and the like. A number of such materials are described in co-pending applications Ser. Nos. 115,820, filed Nov. 2, 1987 and 162,016, filed Feb. 29, 1988 now U.S. Pat. Nos. 4,822,391 and 4,848,994, respectively. Such compounds and their uses described in the aforesaid co-pending applications are incorporated herein by reference.

Heat activated heat pumps consist of a heat engine subsystem which generates high pressure refrigerant vapor, essentially a thermal compressor, and a heat pump subsystem which uses high pressure refrigerant to produce cooling or heat pumping. The thermal compressor, heat pump, and their combination in a heat activated heat pump comprise useful thermodynamic systems which make advantageous use of solid-gas reactions. It is an object of the present invention to use such reactions to even greater advantage and efficiency. Moreover, thermal energy and cool storage systems may also be improved by using staging techniques of the present invention with respect to charge and discharge temperatures as well as energy density.

SUMMARY OF THE INVENTION

The present invention comprises a system utilizing methods and apparatus designed for making highly advantageous use of solid-vapor adsorption/desorption technology. In the reactions, solid reactants react with gaseous reactants to form compounds in which the gas is alternatively adsorbed and desorbed. In the process of the invention, a plurality or series of different compounds are selected based on the vapor pressure of the gaseous reactant. Utilizing a plurality of reactors each of which is charged with a plurality of two or more different solid reactants, the materials are made to adsorb or desorb gaseous reactant at a given constant pressure by adjusting the pressure below or above the equilibrium vapor pressure of the gas. Each of the compounds of a plurality or set of compounds used in the reactors has a different gaseous reactant vapor pressure which is substantially independent of the concentration of the gaseous reactant in the reactor. By selecting the appropriate solids in the set of compounds used to charge the different reactors in the apparatus, and by selecting an appropriate pressure for desorption reactions and typically a different pressure for adsorption reactions, the system can be made to function to take full advantage of continuous adsorption and desorption of the different compounds to achieve thermal compression, heat pumping through mechanical or thermal activation and thermal energy storage. The system of the invention achieves improved efficiency using relatively simple hardware. These as well as other advantages will be evident from the following detailed description.

DETAILED DESCRIPTION

Heat Activated Heat Pump

Figure 1:
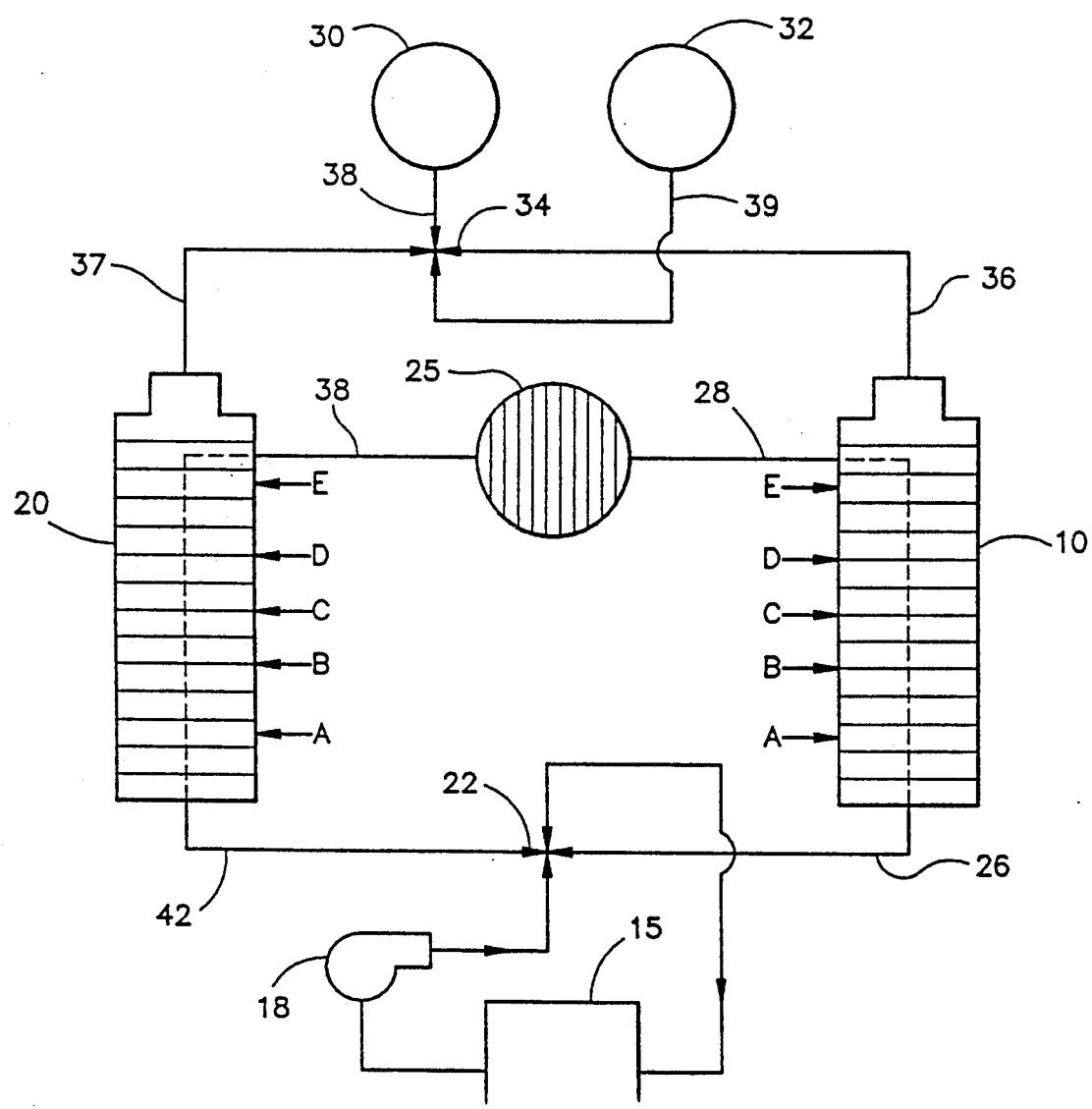
FIG. 1 is a schematic illustrating and example of an apparatus used in the system of the invention.

As used herein, the term "compound" is intended to mean any reaction product formed by adsorption and desorption of a gaseous reactant on a solid reactant within the scope of the invention. In practicing the continuous staging of a constant pressure engine cycle according to the invention, a plurality of two or more different solid reactants are selected, and a plurality or set of different solid reactants is introduced into each reactor in the heat pump apparatus. Each of the compounds of such sets or groups each exhibit different vapor pressure curves, i.e., each has a different vapor pressure-temperature relationship, and which is independent of the concentration of the gaseous reactant. Thus, each of the compounds in a set in a reactor adsorb and desorb the same gaseous reactant at a different temperature at the reaction pressure in the reactor. Compounds are selected and arranged in the reactor in sequence of ascending order of gas vapor pressure. Preferably the compounds of the series are selected so that none of the compounds in the same reactor have an additional coordination step at lower equilibrium temperature which may adsorb more reactant gas from the other compounds during temperature equilibrium or shut-down condition which would reduce cycle performance during intermittent operation. Moreover, masses of each compound are adjusted so that the amount of heat required to desorb each compound is proportional to the temperature difference between that compound and the next higher temperature compound.

The compounds are arranged in the reactors in sequence based on the compound gaseous vapor pressure, and preferably are arranged successively in ascending order of gas vapor pressure. The reactors are provided with means for directing a heat transfer fluid to thermally communicate with the compounds. During process operation the heat transfer fluid is gradually cooled as it passes through a desorbing reactor in which the successive compounds desorb the gaseous reactant at successively lower temperatures. In the adsorbing reactor, the fluid will become gradually heated as it is successively exposed thermally to the succession of adsorbing compounds in which next successive compound in the sequence adsorbs at a higher temperature.

Specific reactants used to form compounds useful in the invention include metal oxides, hydrides, halides, carbonates, nitrites, nitrates, oxalates, sulfides and sulfates. Preferred metals for the inorganic salts are selected from alkali and alkaline earth metals, transition metals, aluminum, zinc, cadmium and tin. Preferred transition metals are manganese, iron, nickel, and cobalt. Double metal chloride salts of metals selected from alkali metals, alkaline earth metals, aluminum, manganese, iron, nickel and cobalt are also useful. Hereinafter these reactants will be sometimes referred to as solids, salts or solid reactants.

Gaseous reactants which are adsorbed on the solids to form compounds which are especially useful in the processes of the invention are ammonia, water, methyl amine and methanol, ammonia being especially suitable because it is stable, and forms high energy complexes. However, hydrogen, carbon dioxide, sulfur dioxide, other lower alkanols, lower alkanes, particularly methane and ethane, pyridine, alkylamines, polyamines and phosphine may also be used. These gaseous reactants may also be referred to as refrigerants herein.

In a specific example of a set or series of compounds, to illustrate a system according to the invention, salts $MgBr_2$, $CoBr_2$, $CoCl_2$, $CaBr_2$ and $SrBr_2$ are used in a heat pump consisting of two separate reaction vessels. The compounds comprise the ammonia ligand complex compound of the aforesaid salts with the $MgBr_2$, $CoBr_2$, $CoCl_2$ and $CaBr_2$ salts forming complexes containing 2 to 6 $NH_3$ and $SrBr_2$ containing 2 to 8 $NH_3$. FIG. 1 illustrates schematically an example of an apparatus embodiment for carrying out the continuous constant pressure staged heat pump with the compounds designated A-E respectively in the order given above beginning with $MgBr_2 \cdot XNH_3$. The salts are charged to reactors 10 and 20, in successive ascending order of the complex compound ligand vapor pressure. Thus, the set of salts in each reactor is aligned as shown successively A-E. In each reactor, there is provided a conduit or equivalent means for supplying a heat transfer fluid to thermally contact the compounds. The compounds may be present in a column in the order as shown, with the transfer fluid supply means comprising a pipe and having suitable means to exchange heat with the compounds. The apparatus includes a burner or furnace 15 with conduits 26, 28, 38 and 42 which direct the heat transfer fluid between furnace 15, reactors 10 and 20, and heat exchanger 25. A valve 22 and pump 18 provide means to assist in directing the heat transfer fluid through the system. Evaporator 30 and condenser 32 are also connected with the reactors via pipes 36 and 37 and valve 34 for directing ammonia vapor to and from the reactors.

In a first reaction phase or half-cycle, valve 22 is positioned such that hot heat transfer fluid is directed via conduit 26 into reactor 10. With the compounds arranged according to their ascending order of vapor pressure the heat transfer fluid will successively thermally communicate with the compounds in the set as it travels along the length of reactor 10.

In this reaction cycle, reactor 10 is the desorption reactor while reactor 20 is the adsorption reactor. Reactor 10 is pressurized to a first pressure, while reactor 20 is pressurized to a second pressure, lower than the first pressure. The desorption reactions in reactor 10 are driven by the heated heat transfer fluid introduced into the reactor via pipe 26 thereby driving these desorption reactions, successively, whereby the heat transfer fluid is gradually cooled as it gives up heat to the desorbing compounds. The cooled heat transfer fluid is then directed via conduit 28 through heat exchanger 25 where it is further cooled to a temperature suitable for introduction into reactor 20 via conduit 38. Reactor 20, in this phase or half-cycle of the process, is the adsorbing reactor in which the set of compounds therein adsorb the gaseous reactant in exothermic reactions. In this reactor, the heat transfer fluid is gradually heated as it is directed along the reactor and is successively exposed thermally to the exothermic adsorption reactions at successively higher temperatures. Thus, as the heat transfer fluid leaves reactor 20 via pipe 42, it is heated substantially relative to the temperature at which it was introduced via pipe 38. The heat transfer fluid is then directed back to furnace 15 where it is again heated to the temperature necessary for driving the endothermic reactions in reactor 10.

During this cycle of the process, the gaseous reactant from the desorption reactor 10 is directed to the condenser 32, and gaseous reactant for the adsorption reactions in reactor 20 is obtained from evaporator 24. The evaporator and condenser are in thermal contact with heat exchangers, not shown for transferring and recovering energy to and from the gaseous reactant.

In the second half-cycle or phase of the process, the pressure in the reactors is reversed such that reactor 20 becomes the desorbing reactor with reactor 10 being the adsorption reactor. Valve 22 is adjusted so that the heated heat transfer fluid is directed initially via pipe 42 to reactor 20, with the reactions then occurring as previously described in the first reaction phase but with the reactors reversed for adsorption and desorption. At the conclusion of the second half-cycle, the valves are again reversed and the first half-cycle as above described repeated.

Figure 2:
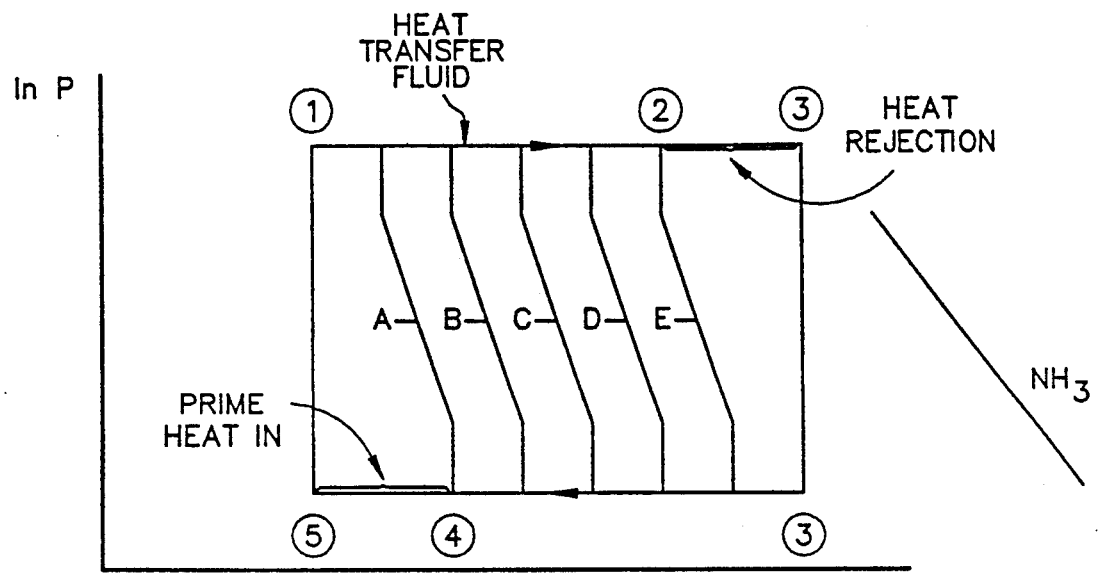
FIG. 2 is a phase diagram illustrating a preferred embodiment the process of the invention carried out in the apparatus illustrated in FIG. 1.

By way of example, the previously described compounds charged into the reactors adsorb and desorb at temperatures and at pressures indicated in the following table. A phase diagram of a process carried using these or similar compounds is illustrated in FIG. 2. For example, in the first half-cycle as previously described, the desorption reaction in reactor 10 will be carried out at substantially constant pressure between points (1) and (3) illustrated in the diagram. The gradual temperature reduction of the heat transfer fluid is also indicated. Additional heat is rejected or removed from the heat transfer fluid between points (2) and (3) through heat exchanger 25 shown in FIG. 1. Similarly, adsorptions in reactor 20 are carried out at the lower pressure between state points (3) and (4). The heat transfer fluid is then heated to the elevated temperature indicated between points (4) and (5), and the cycle continued. The process is reversed when desired or when necessitated by the extent of adsorption and desorption of the compounds in that cycle phase.

TABLE I

| $NH_3$ | Desorb (7.31 Bar) | Adsorb (1.43 Bar) |
|---|---|---|
| | Temp. °K. | |
| $MgBr_2.2/6$ | 562 | 502 |

TABLE I-continued

| NH₃ | Desorb (7.31 Bar) | Adsorb (1.43 Bar) |
|---|---|---|
| | Temp. °K. | |
| CoBr₂.2/6 | 514 | 456 |
| CoCl₂.2/6 | 461 | 416 |
| CaBr₂.2/6 | 416 | 368 |
| SrBr₂.2/8 | 405 | 360 |

From this example of a set or series of complex compounds it is shown that the salts are arranged in decending order of absorption and desorption temperature, which corresponds to an ascending order of compound vapor pressures.

If desired, the evaporator and condenser shown in FIG. 1 may be replaced by reactors containing a solid salt that will adsorb and desorb the gaseous reactant, for example, sodium bromide. Such reactors, cooperating with heat exchangers, alternatively provide heating and cooling. During each half-cycle, one reactor provides cooling while the other is heating. The advantages of using the sodium bromide, or other solid reactant, for adsorbing/desorbing the gaseous reactant as opposed to the condenser/evaporator equipment include (1) higher energy density in the adsorption/desorption reactions as compared to evaporation and condensation of the gas, resulting in higher coefficients of performance and less system mass, and (2) the ability to reject heat at high temperature with lower system pressure than would be required using refrigerant condensation.

Thermal Compressor

The process and system of the invention may also be used as a thermal compressor, which is a subsystem of a heat activated heat pump. For example referring to FIG. 1, by removing condenser 32 and evaporator 30, the resulting sub-system apparatus acts as a thermally activated compressor which receives low pressure vapor through conduit 38 and delivers high pressure vapor through conduit 39. Such a thermal compressor may be used as a less expensive alternative to an electrically driven compressor for obtaining pressurized gaseous reactants. For example, the high pressure gas, from the high pressure desorption reaction vessel, may be directed to a gas turbine, or other apparatus having means for using the gas to perform mechanical work. The resulting lower pressure gas (gaseous reactant) is then returned to the low pressure reactor. Constant pressure staging of appropriate compounds can provide efficient thermal compression of any gaseous reactant, such as water, ammonia, carbon dioxide, sulfur dioxide, methanol and other lower alkanols, alkylamines, polyamines, and phosphine. Hydrogen can also be compressed by use of hydrides in the reactors in place of complex compounds while carbon dioxide can be used with metal oxide/metal carbonate reactants, and water can be used with metal oxide/metal hydroxide or complex compound reactants. Such thermal compression using a process of the present invention is more efficient than conventional thermal compressors because heat is cascaded through several stages and high pressure vapor is generated at each stage.

Heat Pumps Activated by Mechanical Work or Pressure

Figure 3:
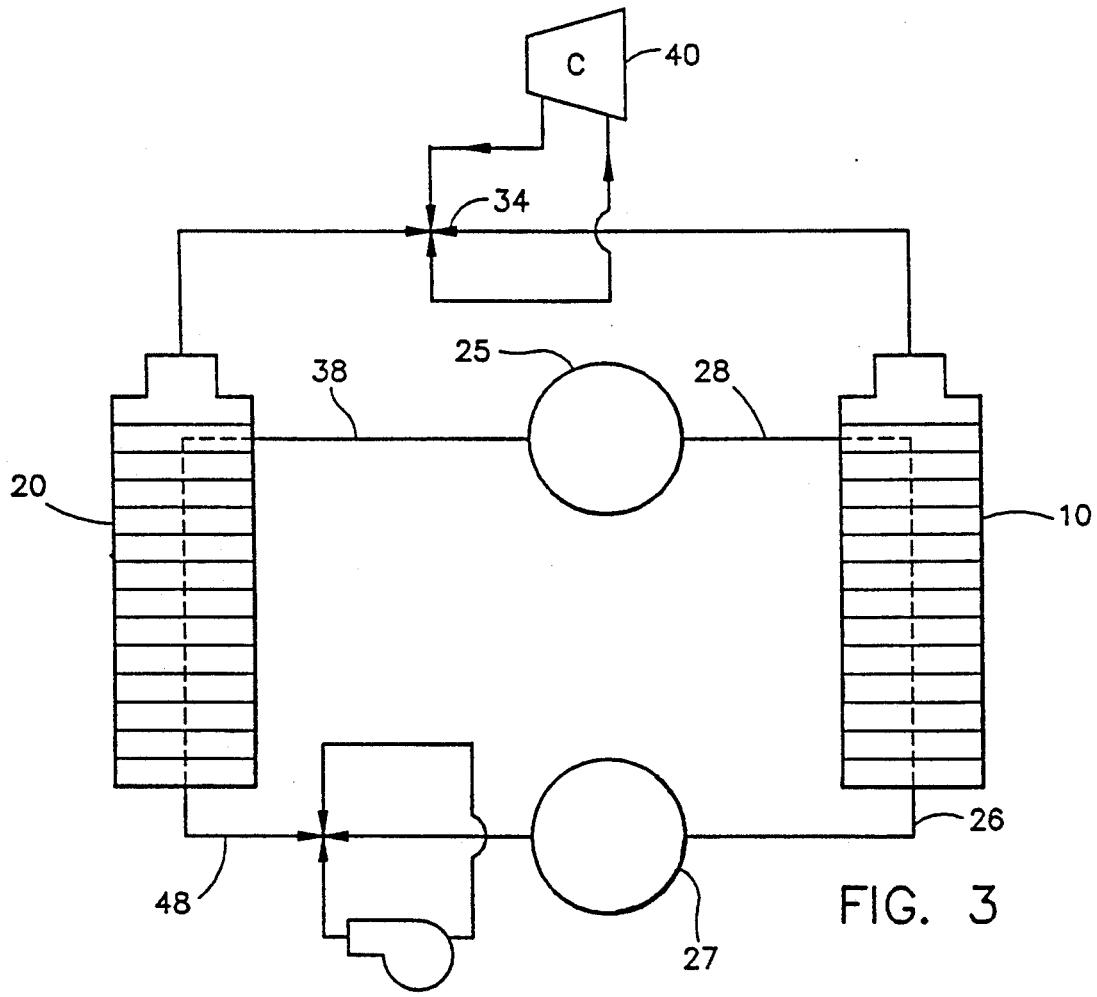
FIG. 3 illustrates a mechanically activated heat pump apparatus embodiment which may be used in a system of the invention.

The constant pressure staging process of the invention may also be used in a heat pump which receives high pressure refrigerant vapor, discharges low pressure vapor, and produces cooling or heating. The high pressure refrigerant vapor can be provided by a mechanical compressor, thermal compressor, for example a constant pressure staged thermal compressor described above, or other source. The constant pressure staged heat pump is most advantageous when coupled with a mechanical compressor, because efficiency and reliability of mechanical compressors increase as compression ratio is decreased and the staging lowers the compression ratio for a given temperature lift or increases the temperature lift for a given compression ratio. Such an apparatus is illustrated in FIG. 3, which is quite similar to the apparatus shown in FIG. 1 except that the evaporator, condenser and furnace or burner have been deleted. In place of the evaporator and condenser, a compressor 40 is used for providing high pressure refrigerant vapor to the reactors in cooperation with the conduits to and from the reactors and valve 34 for directing the gaseous reactant to and from the reactors. Heat exchangers 25 and 27 are used to remove or introduce heat or energy to and from the heat transfer fluid passing successively between the reactors. Again, the compounds are introduced in a set of compounds in ascending order of complex compound vapor pressure. In using mechanical compressor means of FIG. 3 for driving the reactions, the pressures in the vessels described in FIG. 1 are simply reversed.

What is claimed is:

1. A method of staging solid-vapor compound reactions comprising:
   (a) selecting a plurality of two or more different compounds comprising a solid reactant adsorbent and a gaseous reactant adsorbed thereon, wherein each of said compounds has a different gaseous reactant vapor pressure, substantially independent of the concentration of the gaseous reactant,
   (b) locating a first set of the said different compounds in a first reactor and a second set of the said different compounds in a second reactor,
   (c) supplying a heat transfer fluid at a first temperature along said first reactor in thermal communication with said first set of compounds resulting in a first pressure, whereby said compounds desorb said gaseous reactant in endothermic reactions, and
   (d) supplying a heat transfer fluid at a second temperature, lower than said first temperature, along said second reactor in thermal communication with said second set of compounds, and operating said second reactor at a second pressure whereby said compounds therein adsorb said gaseous reactant in exothermic reactions.

2. The method of claim 1 wherein each of said compounds of said first set and each of said compounds of said second set adsorb and desorb the same gaseous reactant at a temperature different from the other compounds of each of said sets, respectively, at the reaction pressures.

3. The method of claim 1 wherein the compounds of each of said first and second sets are located in said first and second reactors in successive ascending order of compound vapor pressure.

4. The method of claim 1 wherein said second pressure is lower than said first pressure.

5. The method of claim 2 wherein the compounds of each of said first and second sets are located in said first and second reactors in successive ascending order of compound vapor pressure.

6. The method of claim 1 wherein the compounds of each of said first and second sets respectively, are the same.

7. The method of claim 3 wherein said heat transfer fluid is directed through each of said first and second reactors to successively thermally communicate with said compounds in successive order of compound vapor pressure.

8. The method of claim 7 wherein said heat transfer fluid is heated to said first temperature prior to being supplied to said first reactor, and becomes gradually cooled as it is directed through said first reactor in successive thermal communication with said compounds therein.

9. The method of claim 8 wherein said heat transfer fluid is cooled to said second temperature prior to being supplied to said second reactor, and becomes gradually heated as it is directed through said second reactor in successive thermal communication with said compounds therein.

10. The method of claim 1 wherein in a first reaction cycle said first reactor is operated at a first pressure and said second reactor at a second pressure, and in a second reaction cycle, said first reactor is operated at said second pressure, and said second reactor is operated at said first pressure.

11. The method of claim 1 including condensing gaseous reactant released from said compounds during said desorption and recovering heat from the gaseous reactant condensation and evaporating at least a portion of said condensed gaseous reactant and absorbing heat from said evaporation.

12. The method of claim 1 wherein said reactors are supplied with said gaseous reactant from an external adsorber/desorber reactor.

13. The method of claim 10 wherein at least a portion of gaseous reactant from said desorption reactions is directed to an external adsorber/desorber reactor having a solid reactant adsorbent therein and wherein at least a portion of gaseous reactant for adsorption reactions is directed thereto from an external adsorber/desorber reactor.

14. The method of claim 1 wherein said gaseous reactant is selected from the group consisting of ammonia, water, hydrogen, carbon dioxide, sulfur dioxide, lower alkanol, alkylamine, polyamine and phosphine.

15. The method of claim 14 wherein said solid reactant is a metal oxide, hydride, halide, carbonate, nitrate, nitrite, sulfate, oxalate or sulfides.

16. The method of claim 15 wherein the metal of said solid reactant is selected from the group consisting of alkali metal, alkaline earth metal, transition metal, aluminum, zinc, cadmium, and tin.

17. The method of claim 14 wherein said solid reactant comprises a double metal chloride, said metals selected from the group consisting of an alkali metal, alkaline earth metal, aluminum, manganese, iron, nickel and cobalt.

18. The method of claim 16 wherein said gaseous reactant is ammonia and said solid reactant is a halide of said metal.

19. An improved method of staging solid-vapor compound reactions comprising:
(a) selecting a plurality of two or more different compounds comprising a solid reactant adsorbent and a gaseous reactant adsorbed thereon, wherein each of said compounds has a different gaseous reactant vapor pressure, substantially independent of the concentration of the gaseous reactant,
(b) locating a first set of the said different compounds in a first reactor and a second set of the said different compounds in a second reactor,
(c) in a first reaction cycle, supplying a heat transfer fluid at a first temperature along said first reactor in thermal communication with said first set of compounds resulting in a first pressure, whereby said compounds desorb said gaseous reactant in endothermic reactions, and supplying a heat transfer fluid at a second temperature, lower than said first temperature, along said second reactor in thermal communication with said second set of compounds and operating said second reactor at a second pressure, lower than said first pressure, whereby said compounds adsorb said gaseous reactant in exothermic reactions,
(d) in a second reaction cycle, supplying heat transfer fluid at a first temperature along said second reactor in thermal communication with said second set of compounds and operating said second reactor at said first pressure, whereby said compounds desorb said gaseous reactant in endothermic reactions, and supplying a heat transfer fluid at a second temperature along said first reactor in thermal communication with said first set of compounds resulting in said second pressure, whereby said compounds adsorb said gaseous reactant in exothermic reactions, and
(e) recovering at least a portion of the energy transferred in said exothermic and endothermic reactions.

20. The method of claim 19 wherein each of said compounds of said first set and each of said compounds of said second set adsorb and desorb the same gaseous reactant at a temperature different from the other compounds of each of said sets, respectively, at the reaction pressures.

21. The method of claim 20 wherein the compounds of each of said first and second sets are located in said first and second reactors in successive ascending order of compound vapor pressure.

22. The method of claim 19 wherein the compounds of each of said first and second sets respectively, are the same.

23. The method of claim 21, wherein said heat transfer fluid is directed through each of said first and second reactors to successively thermally communicate with said compounds in successive order of compound vapor pressure.

24. The method of claim 19 wherein at least a portion of gaseous reactant from said desorption reactions is directed to an external adsorber/desorber reactor having a solid reactant adsorbent therein and wherein at least a portion of gaseous reactant for pressurizing said reactors for adsorption reactions is directed thereto from an external adsorber/desorber reactor.

25. The method of claim 19 comprising directing gaseous reactant from the reactor at the higher pressure to a gas turbine or expansion means for performing mechanical work.

26. The method of claim 19 wherein at least a portion of gaseous reactant from said desorption reactions is directed to means for condensing and evaporating said gaseous reactant.

27. An improved method of operating a mechanical or pressure driven heat pump comprising:

(a) selecting a plurality of two or more different compounds comprising a solid reactant adsorbent and a gaseous reactant adsorbed thereon, wherein each of said compounds has a different gaseous reactant vapor pressure, substantially independent of the concentration of the gaseous reactant, (b) locating a first set of the said different compounds in a first reactor and a second set of the said different compounds in a second reactor, (c) in a first reaction cycle, pressurizing said first reactor at a first pressure with said gaseous reactant and said second reactor at a second pressure with said gaseous reactant, higher than said first pressure, supplying a heat transfer fluid at a first temperature along said first reactor in thermal communication with said first set of compounds, whereby said compounds desorb said gaseous reactant in endothermic reactions, supplying a heat transfer fluid at a second temperature, higher than said first temperature, along said second reactor in thermal communication with said second set of compounds, whereby said compounds adsorb said gaseous reactant in exothermic reactions, and (d) in a second reaction cycle, pressurizing said second reactor at said first pressure with said gaseous reactant and said first reactor at said second pressure with said gaseous reactant, supplying heat transfer fluid at a second temperature along said second reactor in thermal communication with said second set of compounds, whereby said compounds desorb said gaseous reactant in endothermic reactions, and supplying heat transfer fluid at a second temperature, along said first reactor in thermal communication with said first set of compounds, whereby said compounds adsorb said gaseous reactant in exothermic reactions, and (e) wherein desorbed and adsorbed gaseous reactant is directed to and from a mechanical or pressure driven compressor, respectively.

28. The method of claim 27 wherein each of said compounds of said first set and each of said compounds of said second set adsorb and desorb the same gaseous reactant at a temperature different from the other compounds of each of said sets, respectively, at the reaction pressures.

29. The method of claim 28 wherein the compounds of each of said first and second sets are located in said first and second reactors in successive ascending order of compound vapor pressure.

30. The method of claim 28 wherein the compounds of each of said first and second sets respectively, are the same.

31. The method of claim 28 wherein said heat transfer fluid is directed through each of said first and second reactors to successively thermally communicate with said compounds in successive order of compound vapor pressure.

32. An apparatus comprising:
a plurality of two or more reactors, each reactor containing a plurality of two or more different compounds comprising a solid reactant adsorbent and a gaseous reactant adsorbed thereon, each of said compounds having a different gaseous reactant vapor pressure, substantially independent of the concentration of the gaseous reactant therein, said compounds arranged in ascending order of gaseous reactant vapor pressure, means for supplying a heat transfer liquid to and from said reactors, and means for directing the heat transfer fluid through said reactors in thermal communication with said compounds therein, means for directing gaseous reactant to and from said reactors, and heat exchange means for heating and/or cooling said heat transfer liquid and for selectively recovering and/or adsorbing heat therefrom.

33. Apparatus of claim 32 including receiving means for treating gaseous reactant directed from said reactors.

34. Apparatus of claim 33 wherein said receiving means comprises means for condensing and evaporating said gaseous reactant.

35. Apparatus of claim 33 wherein said receiving means comprises means for adsorbing and desorbing said gaseous reactant.

36. Apparatus of claim 35 wherein said means for adsorbing and desorbing comprises reactors containing a solid adsorbent or liquid adsorbent.

37. Apparatus of claim 33 wherein said receiving means comprises a pressure activated heat pump.

38. Apparatus of claim 33 wherein said receiving means comprises a mechanical compressor.

39. Apparatus of claim 33 wherein said receiving means comprises a plurality of two or more reactors each reactor containing a plurality of two or more different compounds therein comprising a solid reactant adsorbent and a gaseous reactant adsorbed thereon, each of said compounds having a different gaseous reactant vapor pressure, substantially independent of the concentration of the gaseous reactant therein, said compounds arranged in ascending order of gaseous reactant vapor pressure.

40. Apparatus of claim 32 wherein said gaseous reactant is selected from the group consisting of ammonia, water, hydrogen, carbon dioxide, sulfur dioxide, lower alkanol, alkylamine, polyamine and phosphine.

41. A mechanical or pressure activated heat pump comprising:
a plurality of two or more reactors, each reactor containing a plurality of two or more different compounds therein comprising a solid reactant adsorbent and a gaseous reactant adsorbed thereon, each of said compounds having a different gaseous reactant vapor pressure, substantially independent of the concentration of the gaseous reactant therein, said compounds arranged in ascending order of gaseous reactant vapor pressure, means for supplying a heat transfer liquid to and from said reactors, and means for directing the heat transfer fluid through said reactors in thermal communication with said compounds therein, means for directing gaseous reactant to and from said reactors, and compressor means for providing high and low pressure gaseous reactant to said reactors.

42. Apparatus of claim 41 including heat exchange means for heating and cooling said heat transfer liquid and for selectively recovering and/or adsorbing heat therefrom.

43. Apparatus of claim 40 wherein said solid reactant is selected from the group consisting of a metal oxide, hydride, halide, carbonate, nitrate, nitrite, sulfate, oxalate or sulfide, and wherein the metal is selected from the group consisting of alkali metal, alkaline earth metal, transition metal, aluminum, zinc, cadmium, and tin.

44. Apparatus of claim 40 wherein said solid reactant comprises a double metal chloride, said metals selected from the group consisting of an alkali metal, alkaline earth metal, aluminum, manganese, iron, nickel and cobalt.

45. Apparatus of claim 41 wherein said gaseous reactant is selected from the group consisting of ammonia, water, hydrogen, carbon dioxide, sulfur dioxide, lower alkanol, alkylamine, polyamine and phosphine.

46. Apparatus of claim 45 wherein said solid reactant is selected from the group consisting of a metal oxide, hydride, halide, carbonate, nitrate, nitrite, sulfate, oxalate or sulfides, and wherein the metal is selected from the group consisting of alkali metal, alkaline earth metal, transition metal, aluminum, zinc, cadmium, and tin.

47. Apparatus of claim 45 wherein said solid reactant comprises a double metal chloride, said metals selected from the group consisting of an alkali metal, alkaline earth metal, aluminum, manganese, iron, nickel and cobalt.

* * * * *